United States Patent
Dedons et al.

[15] 3,704,796
[45] Dec. 5, 1972

[54] PLANT FOR UNLOADING AND HANDLING LOOSE SOLID MATERIAL

[72] Inventors: Pierre de Demandolx Dedons, Dunkerque; Gerard Giroud, Petite Synthe; Daniel Delaunay, Dunkerque, all of France

[73] Assignee: Port Autonome de Dunkerque, Dunkerque, France

[22] Filed: July 22, 1970

[21] Appl. No.: 57,146

[30] Foreign Application Priority Data

| July 25, 1969 | France | 6925466 |
| Nov. 7, 1969 | France | 6938408 |
| Nov. 20, 1969 | France | 6939896 |
| Nov. 21, 1969 | France | 6940051 |

[52] U.S. Cl. ..........................214/14, 212/3, 212/15, 214/10, 214/15 C
[51] Int. Cl. ............................................B65g 63/00
[58] Field of Search.......214/14, 15, 15 C, 15 E, 622, 214/10, 12; 212/3, 13, 14, 15, 16

[56] References Cited

UNITED STATES PATENTS

| 1,396,193 | 11/1921 | Godin | 214/14 |
| 717,162 | 12/1902 | Campbell | 214/15 C |
| 3,414,143 | 12/1968 | Scott | 214/14 |
| 2,750,023 | 6/1956 | Meissner | 214/10 X |
| 3,334,759 | 8/1967 | Ludwig | 214/10 |
| 2,322,504 | 6/1943 | Brandon | 214/14 |

FOREIGN PATENTS OR APPLICATIONS

| 615,321 | 1/1961 | Italy | 214/14 |
| 802,532 | 2/1951 | Germany | 214/14 |

*Primary Examiner*—Gerald M. Forlenza
*Assistant Examiner*—Frank E. Werner
*Attorney*—Christen and Sabol

[57] ABSTRACT

A handling apparatus for transferring loose solid material between a ship, a railroad truck or the like and a stocking area and conversely comprising a beam shiftable vertically or obliquely between two uprights so as to span a wet dock or other operative area. The beam carries longitudinally a conveyor feeding a bucket or two buckets operating alternatingly and moving along a vertical path without any lateral shifting, this being allowed by a tiltable part such as a sloping plane which is brought out of a vertical inoperative position into registry with the bucket in its upper position so as to dump the material dropping out of the bucket into a hopper feeding further conveyors.

40 Claims, 19 Drawing Figures

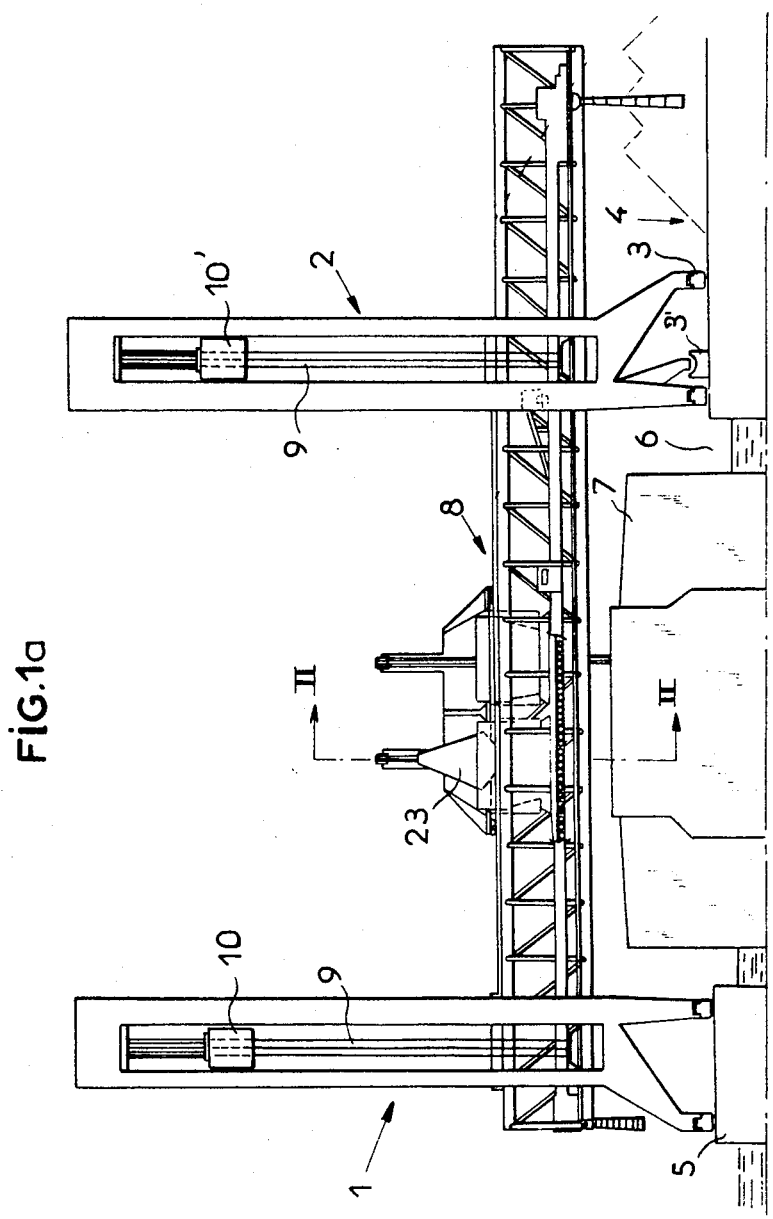

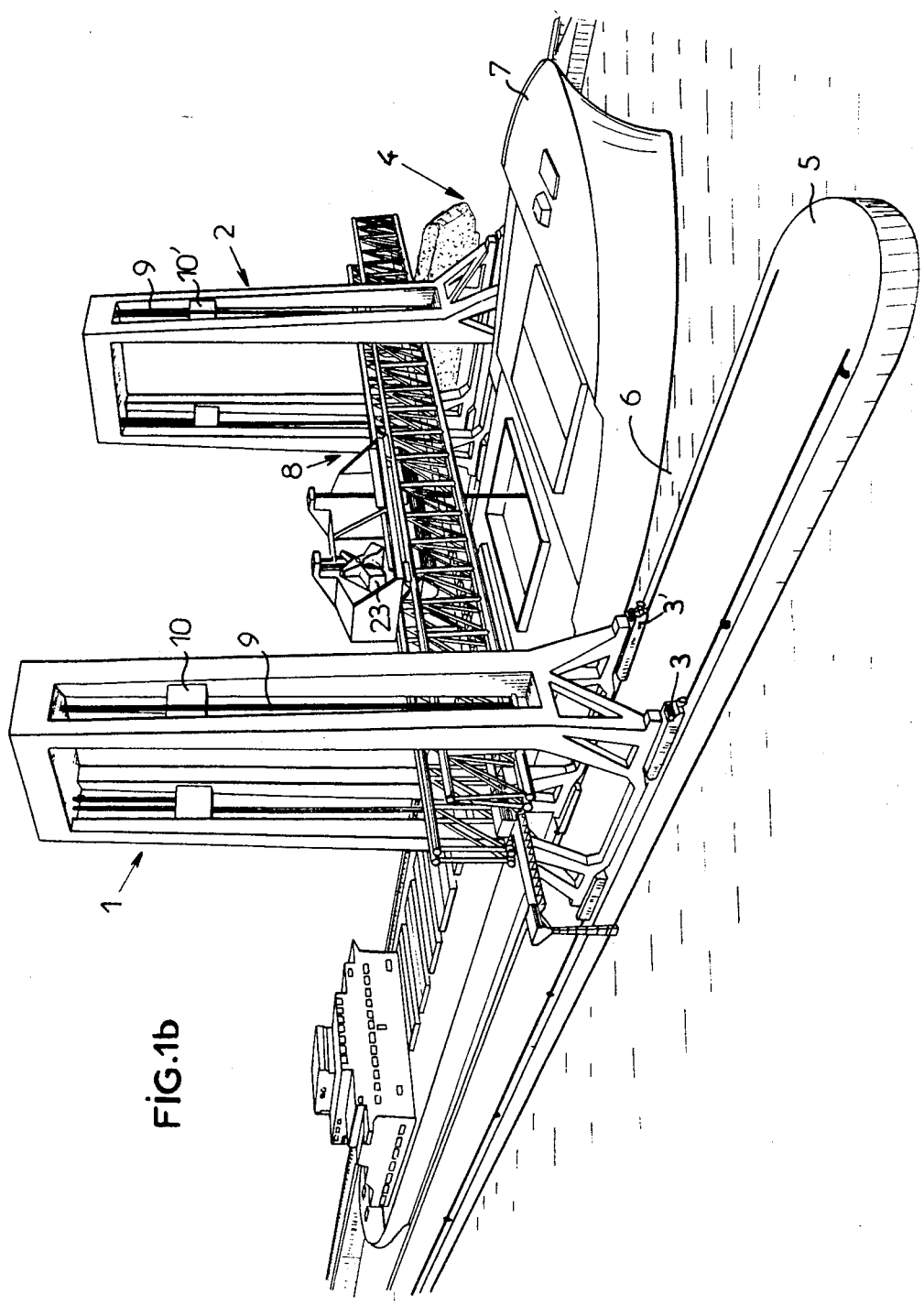

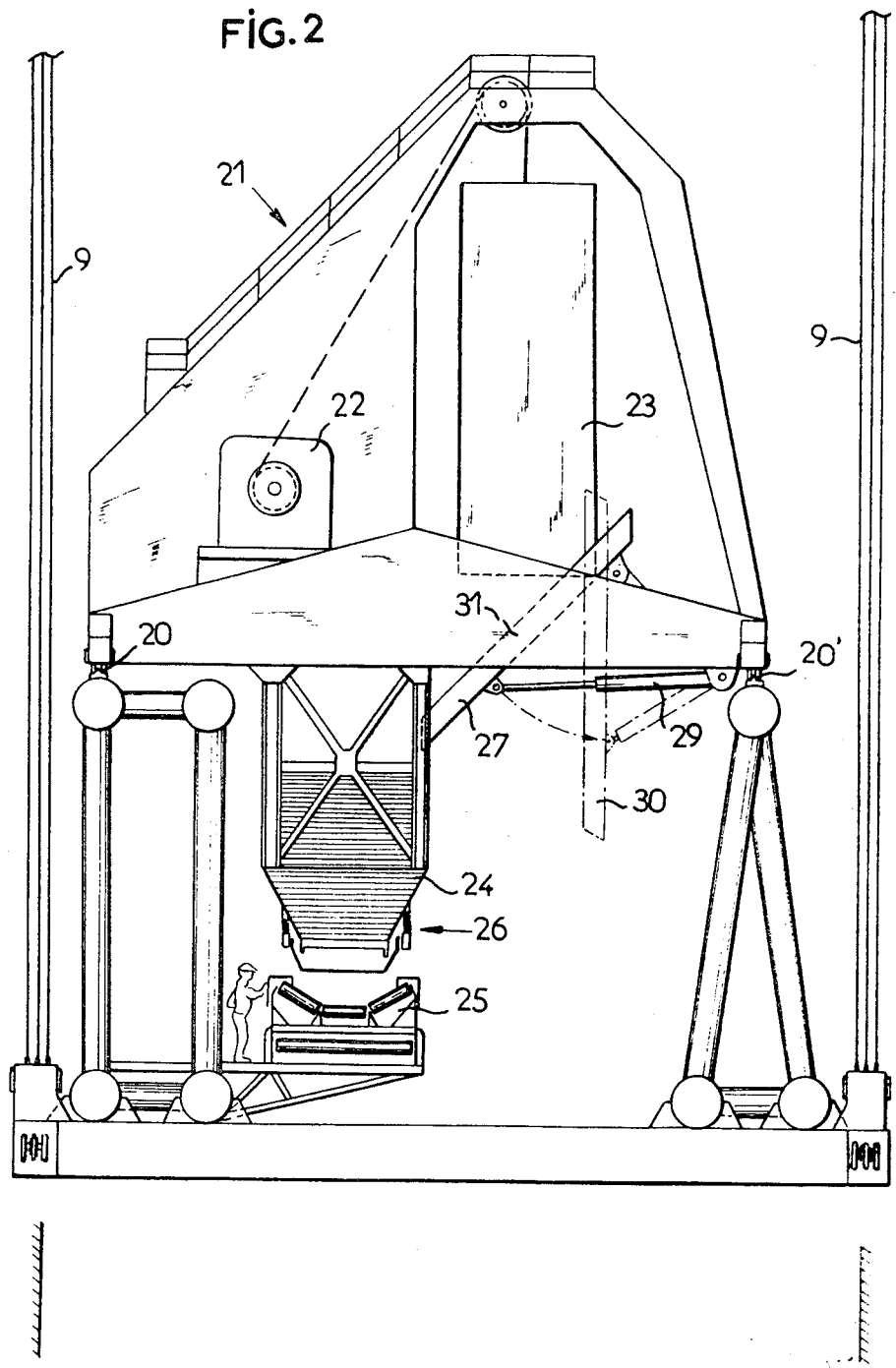

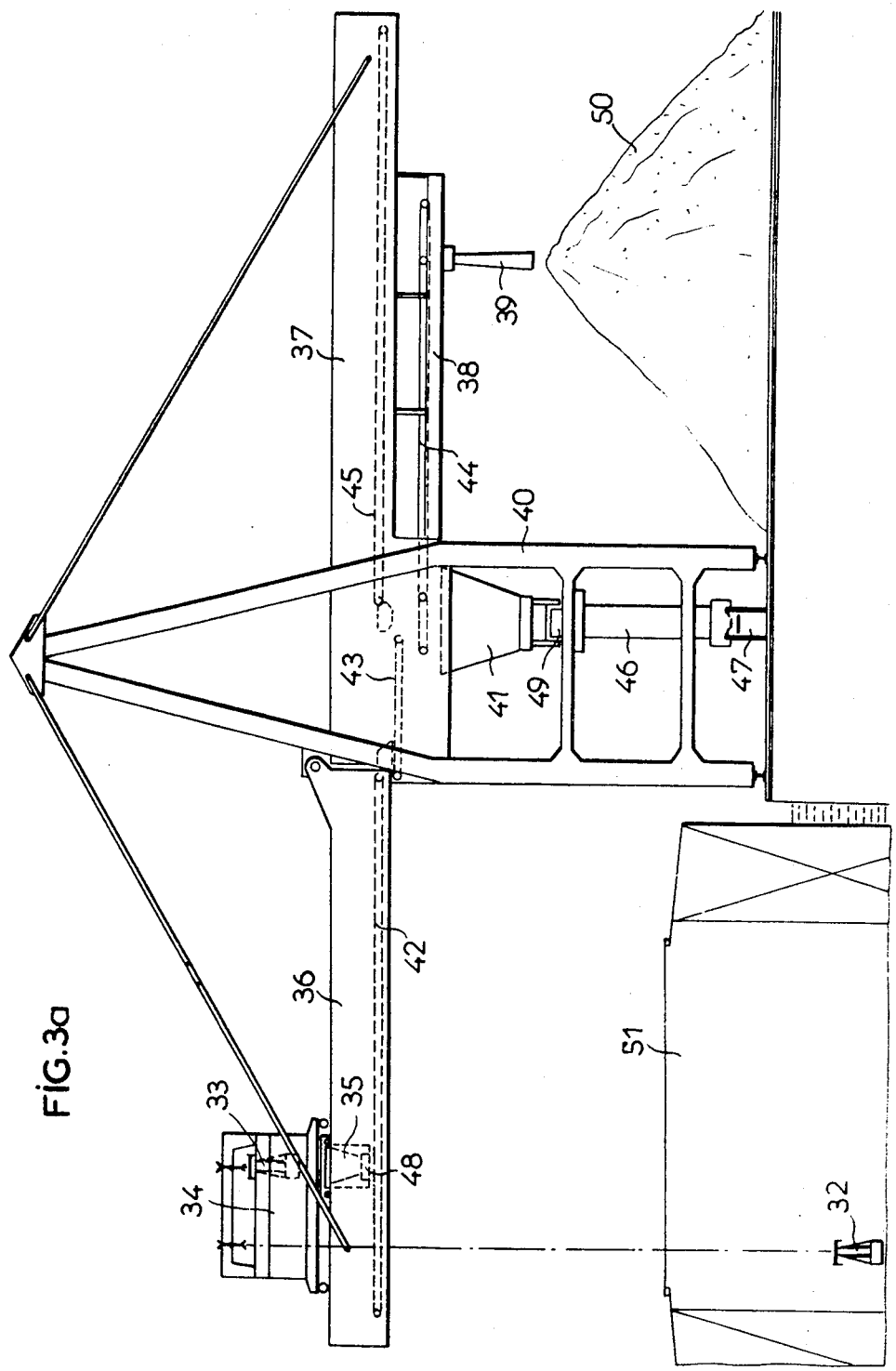

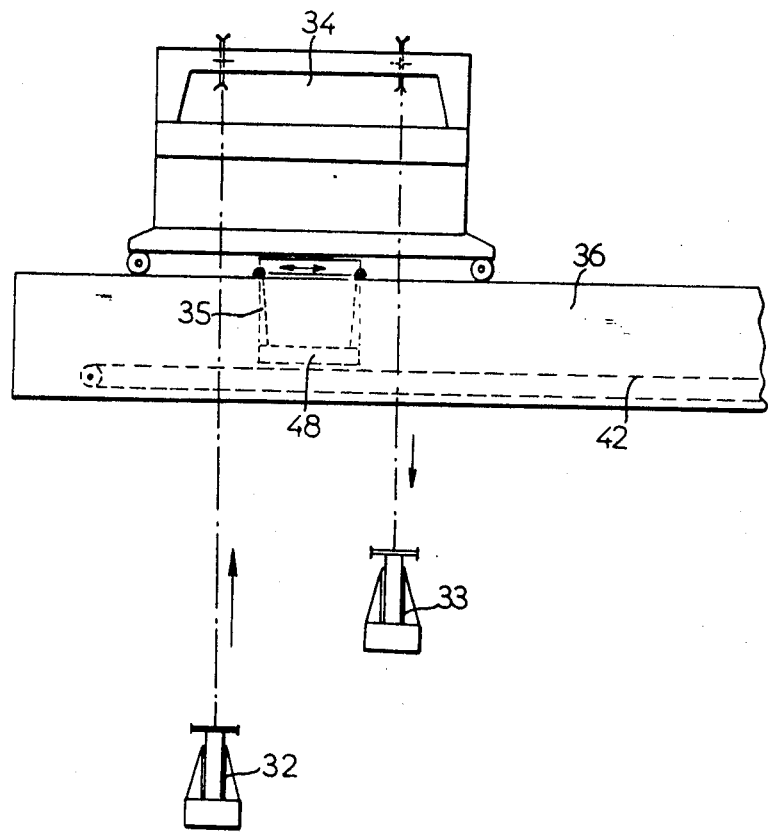
FIG.3b
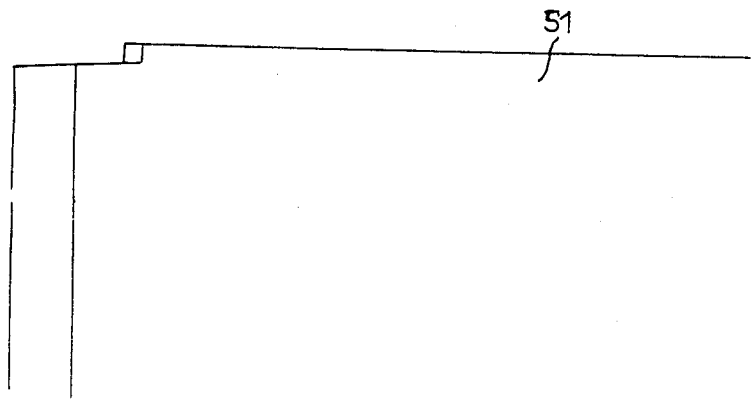

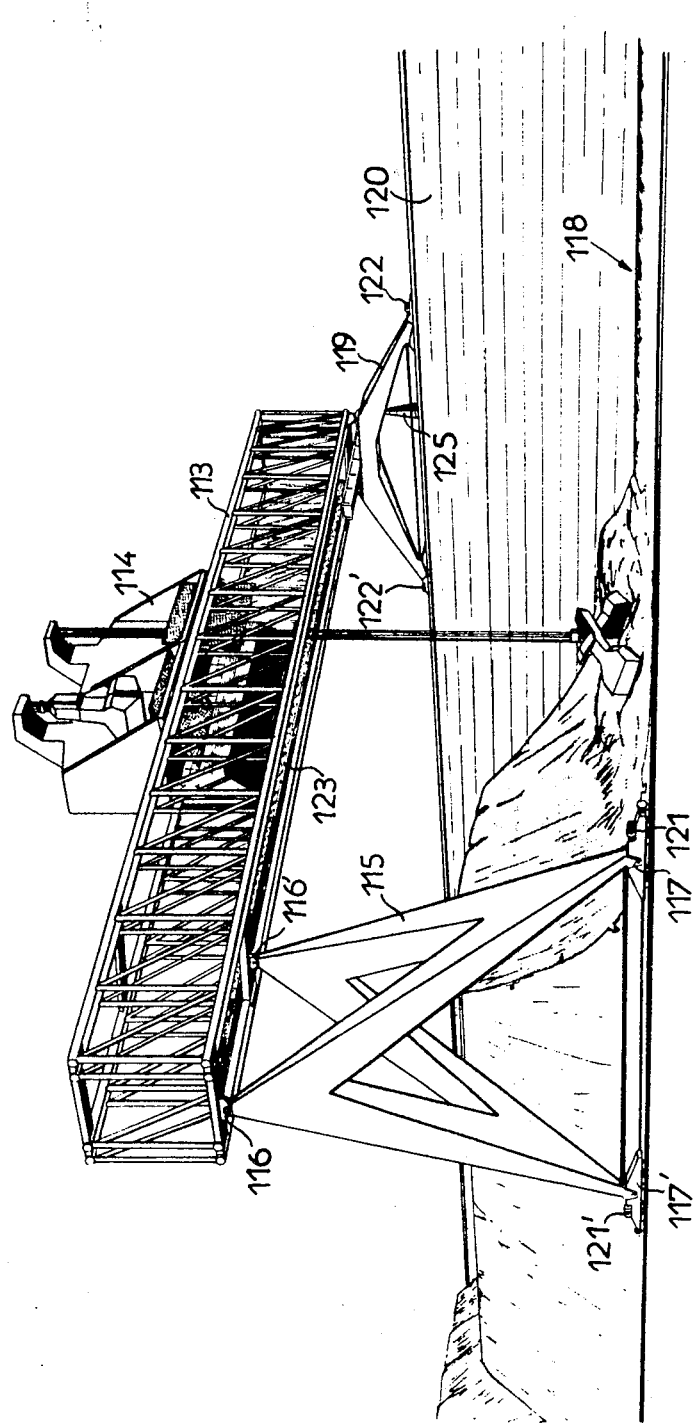

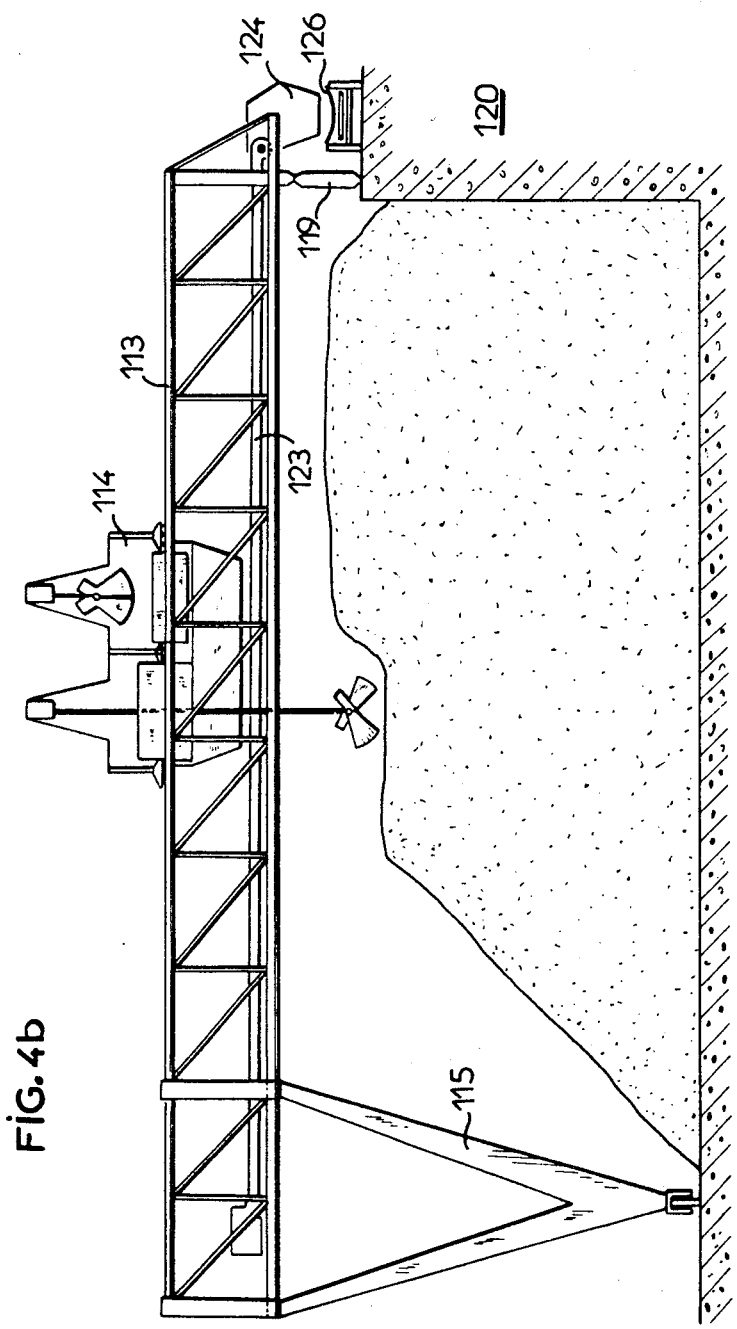

PLANT FOR UNLOADING AND HANDLING LOOSE SOLID MATERIAL

The present invention has for its object an improved plant for the handling of solid material, chiefly for hoisting, unloading storing or picking up loose solid material such as coal, ore or the like.

The plants proposed hitherto for this purpose are constituted either by bucket cranes of a conventional type, or by automatic buckets actuated by a winch-carrying carriage fitted on the vertically movable jib of a gantry, said winch-carrying carriage being adapted to move between a location registering vertically with the heap of material to be picked up and a location registering vertically with a hopper distributing the material onto a conveyor belt. In all such cases however, the automatic bucket has to execute a compound rising and translation movement which limits the output of the plant.

The present invention covers a plant for handling loose solid material of the type including a horizontal gantry beam fitted on at least one lateral support and adapted to extend over the heap of material to be picked up, a winch-supporting carriage adapted to move along the beam and provided with at least one automatic bucket adapted to move vertically the material to be picked up between the heap formed by it up to an upper dumping position, said beam and carriage being associated with a belt conveyor extending in parallelism with the axis of a beam, while a hopper fed by the bucket feeds into its turn the belt conveyor. According to the invention, the feed hopper is associated with mechanical means, the operation of which is synchronized with the movements of the bucket and allow the bucket when reaching its upper position to be discharged directly into the hopper without any horizontal translational movement of the bucket being required, said mechanical means operating as soon as the bucket has been emptied whereby the bucket is allowed to sink back freely along its vertical path towards the heap of material.

According to a first embodiment, the feed hopper is associated with a movable dumping plane adapted to move between an inoperative vertical position lying to one side of the vertical path of the bucket and an operative position for which the dumping plane forms a slope extending underneath the bucket in its upper position while its lower end registers with the upper opening of the feed hopper.

Preferably, the dumping plane is pivotally secured through its upper section round a stationary axis parallel with the axis of the beam and lying outside the vertical path followed by the bucket, said dumping plane being associated with a jack adapted to shift it angularly between its vertical inoperative position and its operative position for which it forms a slope extending underneath the location of the bucket in its upper position, the jack being associated with means providing for the control of the operation of the dumping plane and of its setting in its operative position as soon as the bucket reaches its upper or dumping position.

Further features and advantages of the invention will appear from the reading of the following description, reference being made to the accompanying drawings illustrating by way of example various embodiments of said invention, said description being given merely by way of exemplification and by no means in a limiting sense. In said drawings:

FIG. 1a is an elevational view of a plant according to the invention as intended for the equipment of a wharf in a harbor.

FIG. 1b is a perspective view of the plant according to FIG. 1a.

FIG. 2a is a sectional view through line II—II of FIG. 1a.

FIG. 3a is a diagrammatic view of a modification wherein the beam rests on a single lateral gantry.

FIG. 3b is a detail view of the winch-supporting carriage illustrated in FIG. 3a.

FIG. 4a is a perspective view of a plant serving a stocking area.

FIG. 4b is an elevational view of the plant illustrated in FIG. 4a.

Figure 5:
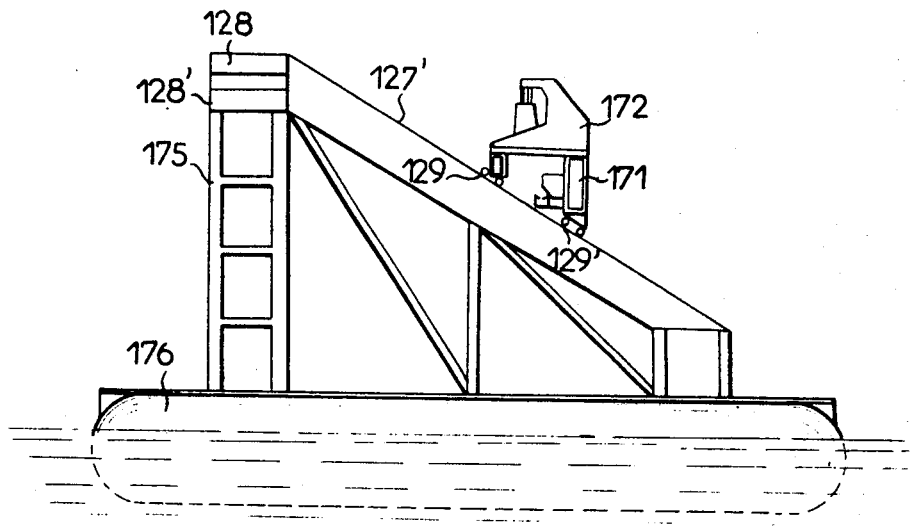
FIG. 5 is a lateral elevational view of a plant in a harbor, wherein one support of the plant is fitted on a float while the other rests on the wharf.

Turning to FIGS. 1a and 1b, two gantries 1 and 2 run on runways 3, 3', the gantry 1 resting through four feet on runways carried by a landing stage 5 and the gantry 2 resting through 3 feet on runways fitted on the wharf 4 on which material is to be dumped, said landing stage 5 forming with the adjacent wharf a wet dock 6 defining the anchoring berth for a ship 7 to be unloaded.

A transverse beam 8 carried by the two gantries interconnects them rigidly together; said beam including a stayed skeleton may move vertically between the gantries and to this end the beam is suspended to cable the systems 9 and 9' controlled by two winches carried at the upper ends of the gantries and associated with counterweights 10 and 10'. When operative, the transverse beam 8 rests on a rack system which is not illustrated. It is apparent that the transverse beam extends over the wet dock 6 in overhanging relationship with reference to the ship 7 in her unloading berth.

The transverse beam 8 extends beyond the gantry 2 on the wharf, so as to extend over a stocking area or a preliminary stocking area.

FIG. 2 is a detail sectional view of the transverse beam 8 provided with the hoisting and unloading apparatus.

The beam is provided on its upper surface with two lateral raceways 20 and 20' formed in the case illustrated by rails on which the winch-supporting carriage 21 bears. The winch 22 on said carriage controls two picking up buckets, the bucket 23 being illustrated in the drawings in its upper position while the other lying in its lower material-grasping position cannot be seen in the drawing. The winch-supporting carriage carries underneath its lower surface a hopper 24 adapted to move with it and lying over a conveyor belt 25 extending axially underneath the beam 8 and adapted to convey the loose material, poured continuously out of the hopper by the extracting mechanism 26 towards one end of the beam 8, for instance towards the preliminary stocking area arranged on the wharf 4.

The hopper 24 is shifted laterally with reference to the path followed by the buckets so as not to disturb the movements of the latter and to limit the hoisting operation to a mere linear vertical movement of the buckets. In order to allow the bucket to empty into the hopper thus located in another vertical plane, there is provided a dumping plane 27 pivotally secured at 25 along its upper edge and controlled by a jack 29 which shifts it between an inoperative vertical position 30 freeing the passage provided for the buckets and an operative position 31 for which the dumping plane is positioned underneath the bucket in its upper portion so as to form thus a slope over which the material discharged out of the bucket flows into the hopper. The operation of the jack is controlled by an end-of-stroke switch carried by the bucket in a manner such that the dumping plane is returned into its operative position as soon as the bucket has been raised into its discharging position.

FIG. 3a and 3b illustrate a modification of the invention according to which the two buckets pour material out of the ship 51 into a hopper 35. During the upward and downward movements of the buckets, the hopper 35 lies in a medial position 35' and when one of the buckets is in its uppermost position, the hopper enters a position underneath said bucket so as to collect the material. As soon as the bucket is empty, the hopper returns into its intermediate inoperative position 35' freeing the downwardly directed path of the bucket. An extracting mechanism 48 discharges the contents of the hopper onto the belt conveyor 42 which in its turn feeds the material onto the conveyor 43. A further conveyor 44 can occupy two positions : a receding position on the right-hand side for which it allows the material to drop freely off the conveyor 43 into the hopper 41 whereas in its left-hand projecting position said conveyor 44 collects the material off the conveyor 43 so as to feed it through the agency of the trough 39 onto the preliminary stock 50.

The winch-supporting carriage 34 carrying the buckets may be shifted together with the hopper 35 throughout the length of the beams between their forward and rearward ends 36 and 37. Thus, the same plant may pick up material off the preliminary stock 50 and feeds it onto the conveyor 44 which finally removes the material onto the conveyor 47 through the agency of the hopper 41, the extracting mechanism 49 and the belt conveyor 46.

Figure 15:
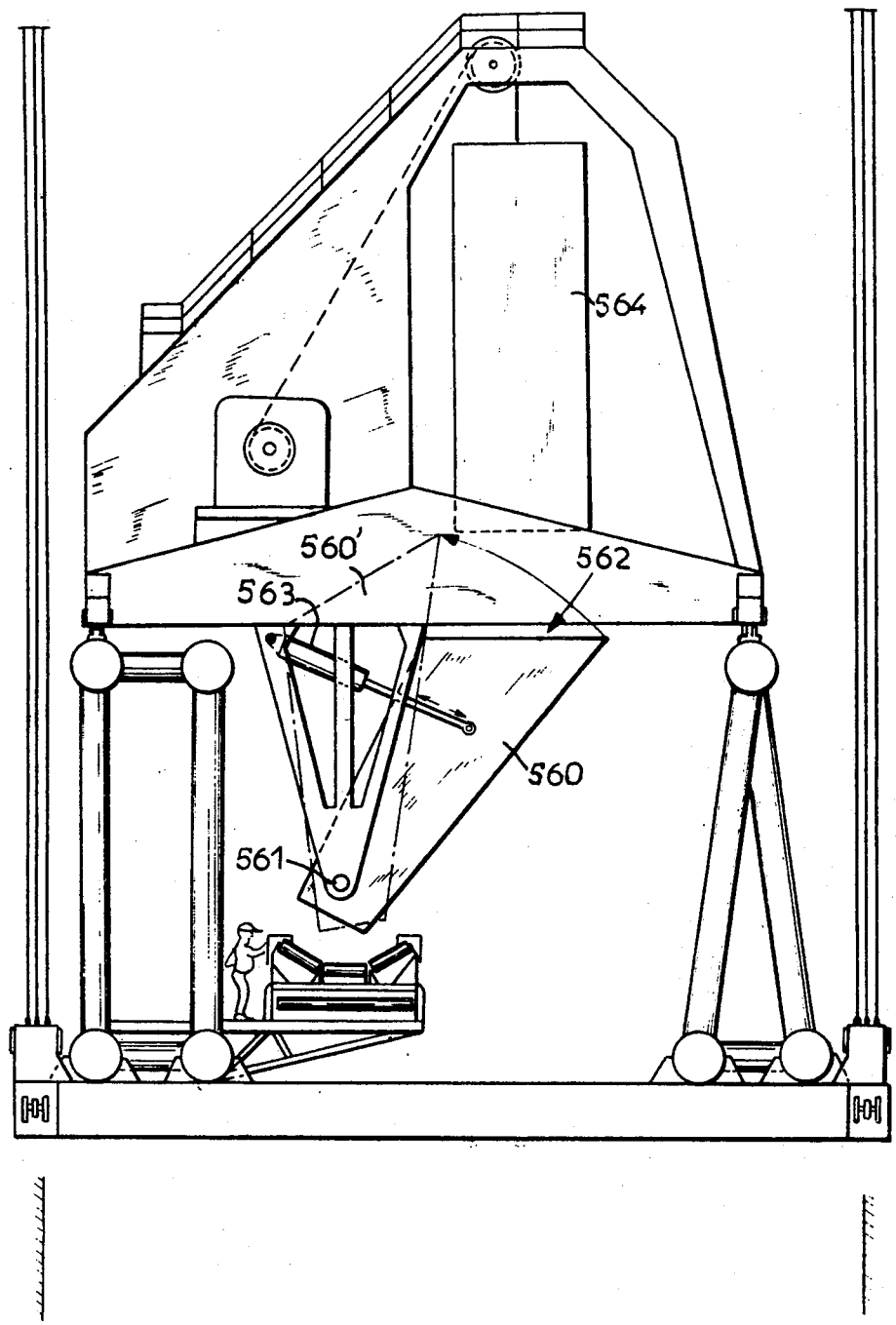
FIG. 15 is a side elevation of a modified form of hopper.

According to the variant shown in FIG. 15, the hopper 560 is made to rock about an axis 561 positioned in its base and thus suitable for presenting, in inclined position, its upper opening 562 beneath the bucket 564 in dumping position, the pivoting hopper being associated with a maneuvering jack 563 controlled by the movement of the bucket 564 and suitable for bringing the hopper into inclined or dumping position 560, when the bucket arrives in high position, and for returning the hopper in vertical position 560' after dumping of the bucket, thus clearing the vertical path of the bucket.

Figure 16:
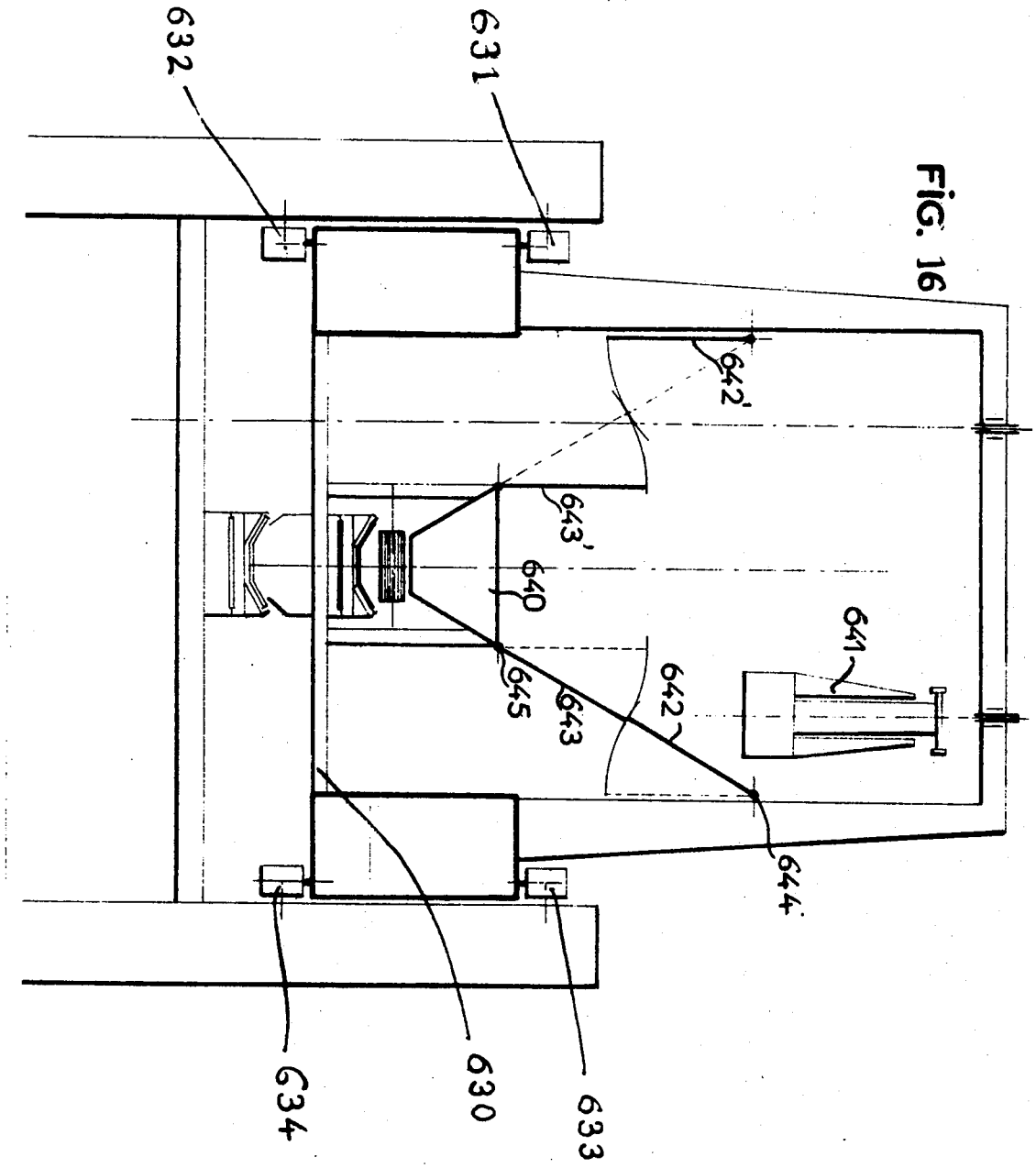
FIG. 16 is a side elevation similar to FIG. 2 of another modified form of hopper.

FIG. 16 shows a variant of the installation, in which the beam 630 is axially slidable on the gears 631, 632, 633 and 634 so as to allow the buckets 641 to overhang the heap or the ship's hold; the hopper 640 is common to the two buckets of which bucket 641 is shown in high position, the other bucket in low position not being visible in the drawings. The hopper 640 is supplied by an articulated dumping plane, constituted by two panels 642 and 643, articulated at 644 and 645. The closed panels cause the product to slide in the hopper 640. Each panel is moved by a jack (not shown in the drawings) controlled by the movement of the corresponding bucket; the panels being placed in operational position (corresponding to the position of panels 642 and 643) as soon as the bucket has arrived in high position, immediately preceding the dumping operation. As soon as the dumping has terminated, the panels retract into the position of panels 642' and 643' in order to allow free downward passage of the bucket and the taking up from the heap.

It is apparent that the plant according to the invention implies a complete change in unloading techniques, chiefly in plants erected in harbors.

On the one hand, the improved plant cuts out the compound movements of the picking up buckets and substitutes therefor a single, simple and linearly reciprocating vertical movement of the buckets between a lower material picking up position and the upper discharging position which allows much time to be saved during each operation and increases to a considerable extent the yield of each bucket, the operative rotations of which are much more numerous.

Furthermore, the improved plant according to the invention allows, through the positioning and seating afforded for the hoisting apparatus, twice more buckets to be used, while benefiting by a reduction in the weights to be handled, one bucket sinking when empty forming a counterweight for the upwardly moving bucket, whereby each operation may benefit by an increased speed and a lesser expenditure of energy.

In the example illustrated in FIGS. 4a and 4b, the plant according to the invention serves a stocking area. The transverse beam 113 carrying the winch-supporting carriage 114 rests at one end on a V-shaped support 115 through pivotal connections 116, 116' and 117, 117' at its upper and lower ends, which arrangement automatically compensates for any possible unevenesses of the level of the ground forming the stocking area 118. The V-shaped support 115 is fitted on a rail and the same is the case for the support 119 of a reduced size at the other end of the beam 113, said opposite support resting on a lateral wall 120. The beam 113 provided with its winch-supporting carriage and two buckets on the latter serves the stocking area along which it is adapted to move on its supports, which latter are driven by the motors 121, 121', 122, 122'; the belt conveyor 123 fed by the hopper receiving the material discharged by the bucket empties laterally into the dumping hopper 124 or into a trough 125 feeding a longitudinal belt conveyor 126 fitted on the lateral wall 120.

Figure 6:
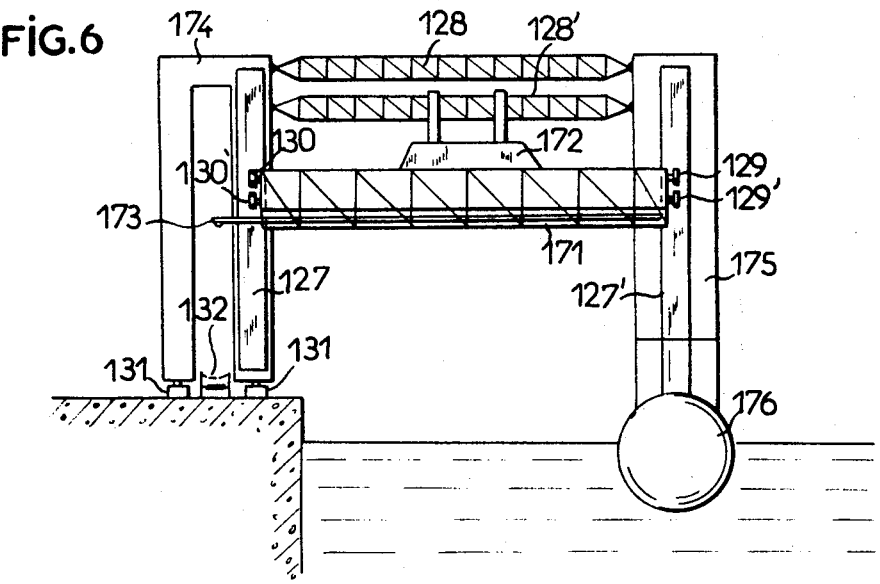
FIG. 6 is an elevational front view of the plant illustrated in FIG. 5.
Figure 7:
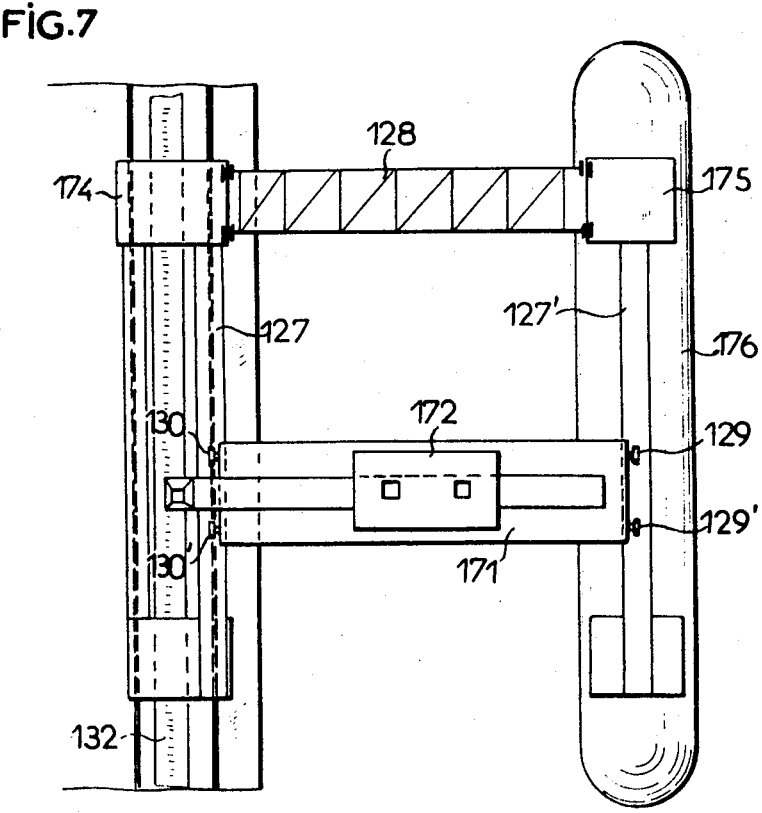
FIG. 7 is a plan view of the plant illustrated in FIGS. 5 and 6.

In the embodiment illustrated in FIGS. 5, 6 and 7, the plant is adapted to equip a harbor-serving dumping station on a wharf. To this end, the transverse beam 171 associated with the winch-supporting carriage 172 and conveyor 173 rests at one end on the lateral support constituted by an automatically stabilized gantry 174 provided with four feet while at the opposite end the transverse beam rests on a support 175 carried by a float 176.

The beam 171 rests directly on the slopes or slideways 127 and 127' rigid respectively with the stationary gantry support 174 and with the support fitted on the float 175. The two supports 174–175 are connected through their upper ends by framework arms 128, 128' pivotally secured at their ends on the one hand to the support 174 and on the other hand to the floating support 175, the system forming a securing system of the pivotal link type.

The beam 171 is adapted to move translationally along the slopes or slideways 127, 127' through the agency of the rolling gears 129, 129' and 130, 130' carried at its ends, whereby a vertical adjustment of the location of the beam is obtained, said beam being thus brought to an optimum level with reference to the plane of the ship and being vertically shifted away when required so as to afford a passage for the superstructure of the ship. As a matter of fact, before and after the unloading operations and in order to allow the handling of the ship setting her in her berth without being disturbed by the plant, the latter may collapse entirely away from the berth, as provided by a translational movement alongside the wharf. To this end, the support 174 constituted by a gantry with 4 feet can move through its running gears 131, 131' for instance along rails, the floating support being carried along with said movement or optionally being drawn along by external means.

In this embodiment, the belt conveyor 173 discharges into conveying means which may operate in fact through mere gravity and be rigid with a lateral slideway or trough 127, the conveying means ending facing a conveyor belt 122 extending in parallelism with the wharf.

The float 125 is provided with automatic ballasting means compensating the modifications in load of the plant considered as a whole.

Figure 8:
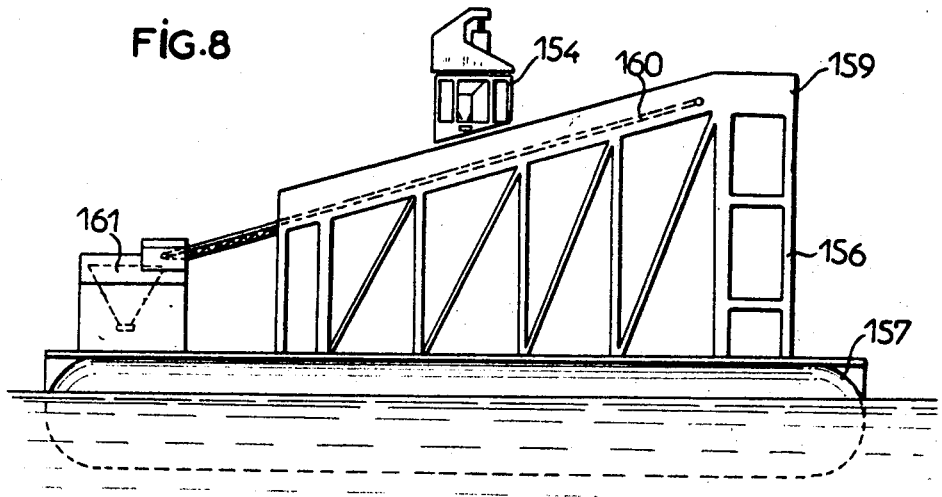
FIG. 8 is a lateral elevational view of an independent gantry fitted on two floats.
Figure 9:
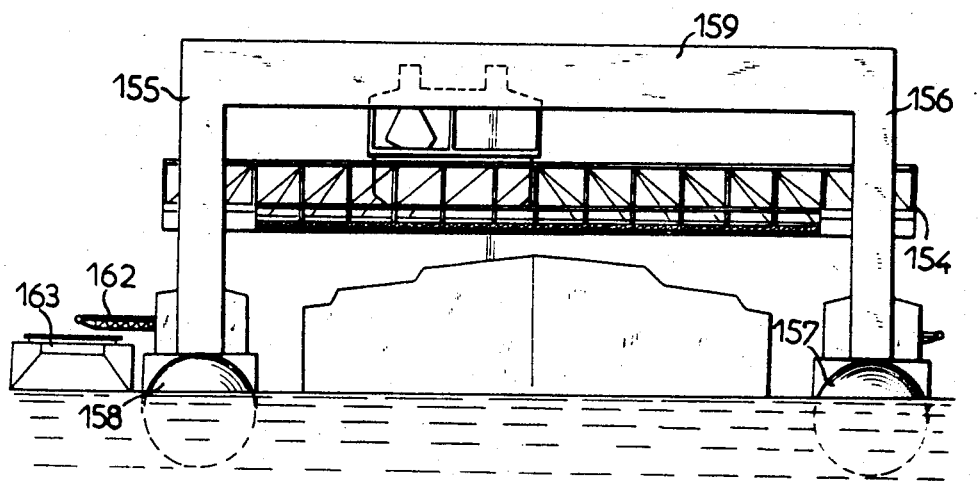
FIG. 9 is a front elevational view of the floating gantry illustrated in FIG. 8.

In the embodiment illustrated in FIGS. 8 and 9, the two supports 155 and 156 on the sides of the unloading beam 154 are carried each by a float 157 or 158 respectively and their upper ends are rigidly connected by a cross-beam 159. The lateral supports are associated as disclosed precedingly each with a longitudinal slope on which the unloading beam 154 rests with the interposition of running gears allowing its translational movements along said slopes and consequently its upward and downward movements.

One of the slopes extending longitudinally of the supports includes a conveyor 160 along which a belt conveyor moves, which belt conveyor extends alongside the unloading beam 154. Said conveyor leads to a hopper 161 lying in a lower position and forming a buffer, said hopper discharging onto an auxiliary conveyor belt 163 extending into vertical registry with a berth provided for a barge 163 laterally of one of the floats.

The modifications illustrated in FIGS. 10 to 13 show applications of the invention adapted to execute more complex arrangements associating an unloading harbor plant with one or more stocking areas also provided with picking up means such as a gantry according to the invention.

Figure 10:
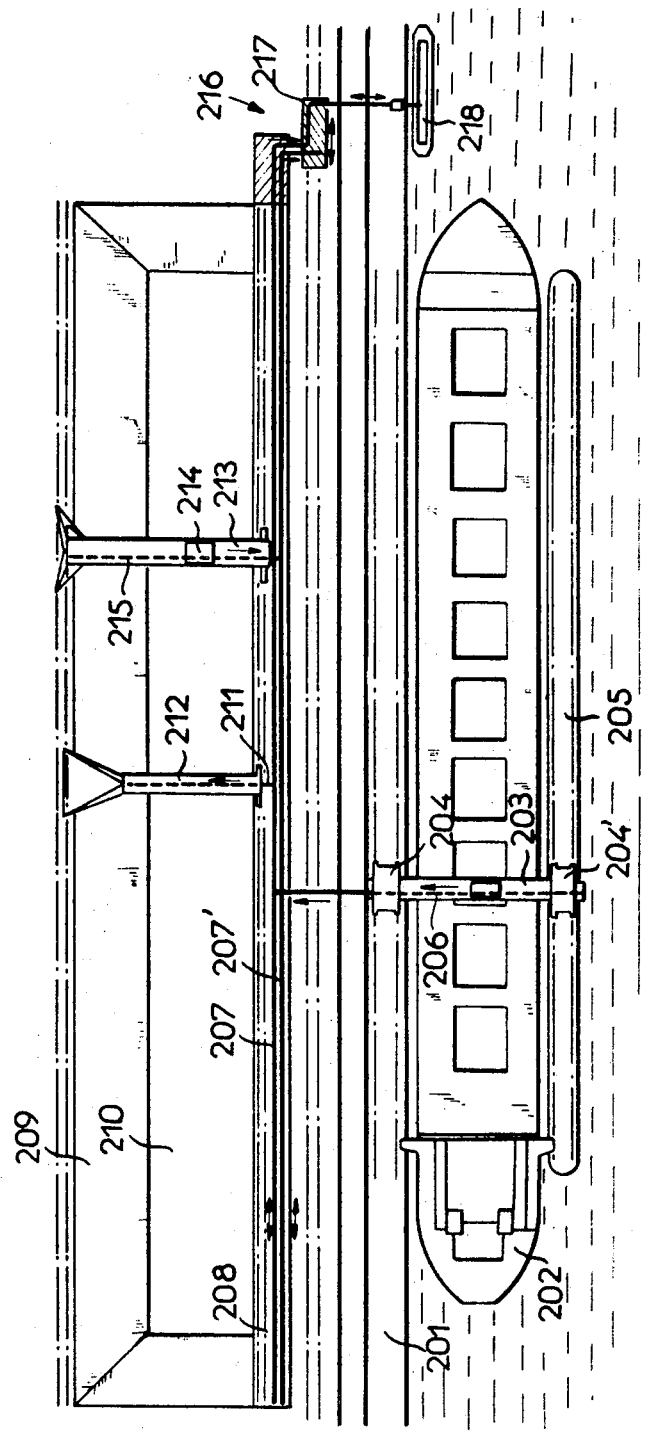
FIG. 10 is a plan view of a harbor plant adapted to unload a ship and associated with a stocking area.

In the example illustrated in FIG. 10, the plant includes a station 201 on the wharf for the unloading or loading of a ship 202, for instance an ore-carrying ship. Said station includes an unloading beam 203 resting on lateral supports 204, 204' located respectively on the wharf and the other on a landing stage 205 parallel with the wharf. The unloading and/or loading beam is provided with hoisting and picking up means operating within the holds of the ship so as to discharge the material removed out of the hold onto a belt conveyor 206 extending laterally along the beam beyond the latter as provided by suitable supports until it reaches the conveyors 207, 207' carried along the upper edge of the wall 208 which lines laterally the stocking area 209 and the heap of material 210. The conveyor 206 fed by the hoisting means discharges continuously the discharged material onto one of the conveyors, in the case illustrated in FIG. 10 onto the longitudinal conveyors 207', which latter carries the material along the wharf until it reaches a conventional angular transmission which allows the material to be discharged onto the end of a belt conveyor 211 extending beyond a gantry 212 and pouring thus material into the heap 210.

The picking up of the material is executed by the material picking up gantry 213 provided as disclosed hereinabove with hoisting means such as a winch-supporting carriage 214 controlling one or more buckets feeding the axial conveyor belt 215 which latter discharges the material onto the longitudinal conveyor 207 adapted to carry said picked up material up to the loading station 216 adapted to load the railroad carriage 217 or the lighter 218. Optionally, the conveyor 207 fed with the pick up material may convey the latter onto the beam 203 through the agency of the conveyor 206, the station on the wharf operating thus so as to load the ship.

Figure 11:
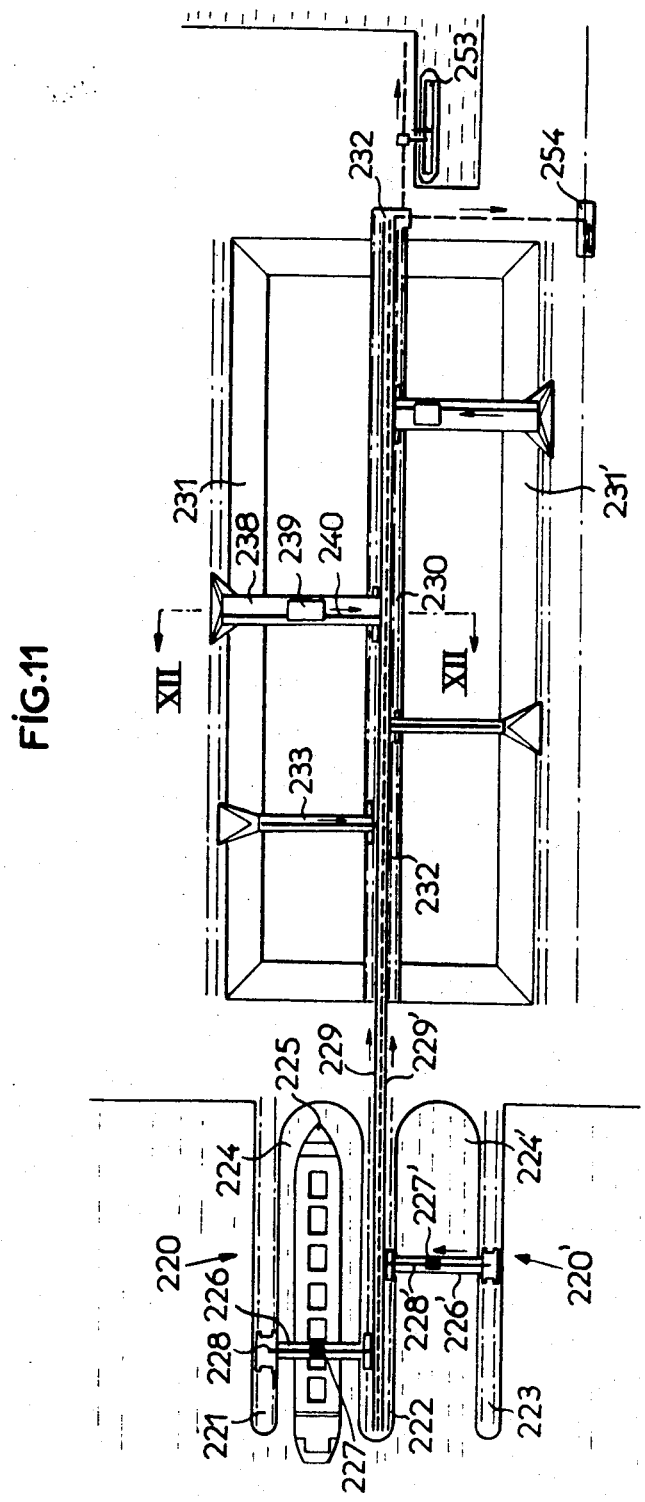
FIG. 11 is a plan view of a modified plant including two unloading stations associated with twin stocking areas.
Figure 12:
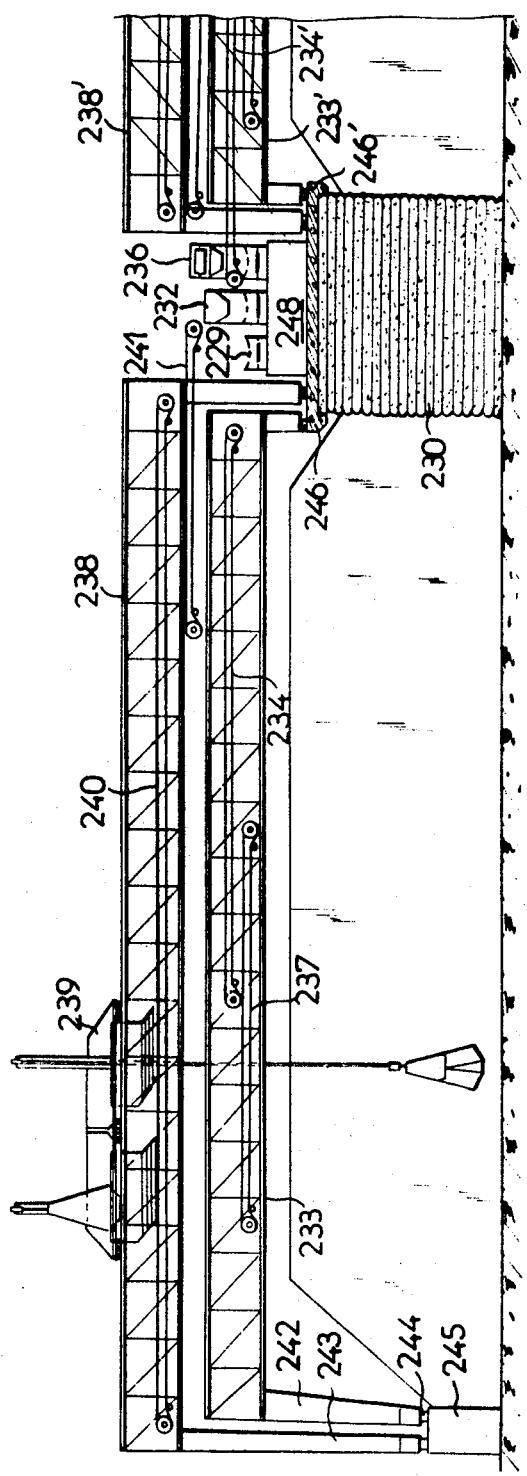
FIG. 12 is a transverse sectional view through line XII—XII of FIG. 11.
Figure 13:
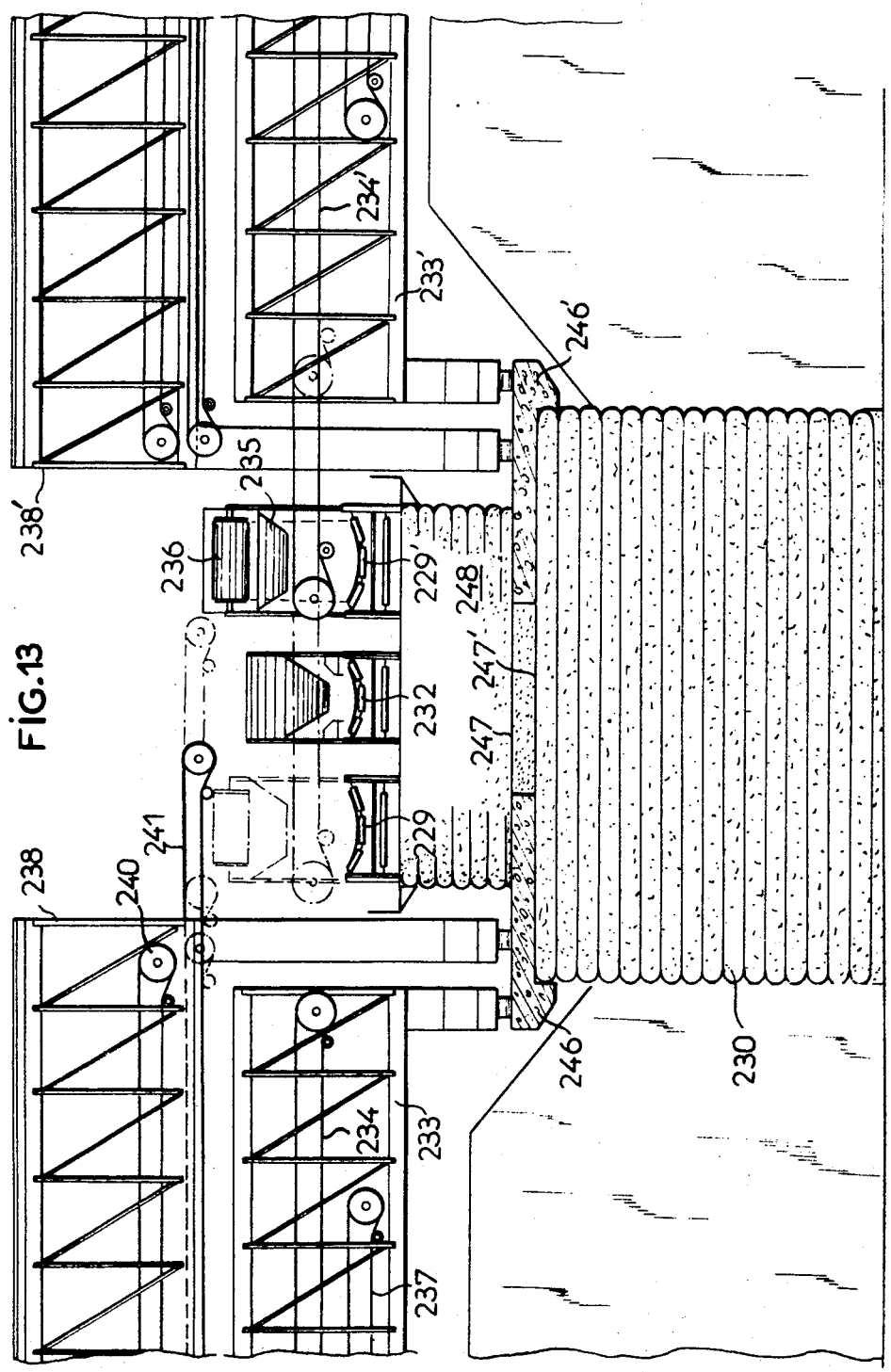
FIG. 13 is a detail sectional view of the wall incorporated with the plant illustrated in FIGS. 11 and 12.

A more complex arrangement is illustrated in FIGS. 11, 12 and 13. Said embodiment includes two ship loading and/or unloading stations. Said twin stations 220 and 220' are constituted by three landing stages 221, 222 and 223 enclosing between them two wet docks 224 and 224' adapted to receive ships such as that illustrated at 225 which is anchored in the wet dock 224'. Each of the wet docks is spanned by a loading and/or unloading apparatus comprising a beam 226 or 226' fitted on lateral supports, for instance gantries resting on several feet and running along the landing stage so as to allow the loading and/or unloading beam to serve the entire area receiving the ships at anchor.

Each beam is provided with hoisting means such as a winch-supporting carriage provided with one or more buckets 227, 227' feeding a conveyor 228 or 228' respectively, extending axially of the beam and adapted to be discharged onto one of the unitary conveyors 229 or 229' extending over the wall 230.

The stocking plant includes two stocking areas 231, 231' separated by the wall 230, which latter carries the longitudinal conveyors 229 and 229' starting from the unloading and/or loading harbor station, together with a central conveyor 232 extending towards the outer station loading barges as shown at 253 or railway cars or trucks as shown at 254. Obviously, the loading stations for river or railroad traffic may be operated for unloading, in which case the central conveyor 232 would convey the material coming from such peripheral stations towards the desired heap of material. Similarly, the stations for sea traffic served by the conveyors 229 and 229' may serve for the loading of a ship after picking up the material from the stock, the conveyors 229 and 229' feeding then the axial conveyors 228, 228' on the beams 226, 226' after the hoisting apparatus, 227 or 227' as the case may be, has been rendered inoperative. The axial conveyors 228, 228' pour then the material taken off the heap into the ships in their berths.

The setting of the material on the heap is executed by either of the longitudinal conveyors 229, 229' or 232, the number of operative conveyors not being defined otherwise than by special regulations and by the size of the plant.

To this end, each stocking area includes a gantry 233 adapted to pour the material onto a heap and including an axial conveyor 234 subjected to a translational movement along the axis of the gantry so as to enter a position underneath the deflection means provided for the central conveyor. This is shown in detail in FIG. 13. The conveyor 234' on the gantry 233' extends towards the wall 23o beyond the marginal edge of the gantry so as to enter a position underneath the deflecting means 236 provided for the longitudinal conveyor 229' so as to receive the load on the latter through the agency of the hopper or funnel 235 (FIG. 12). The main conveyor such as 239 on the gantry drops the material onto an auxiliary conveyor 237 adapted to move axially along the gantry so as to serve also after reversal of its directions of progression the stocking area throughout its breadth.

The removal of material off the heap is obtained by the corresponding gantry 238 provided with hoisting means such as a winch-supporting carriage 239 carrying one or preferably two buckets adapted to pour their contents into the axial conveyor 240. The latter is associated with a lower auxiliary conveyor 241 adapted to be shifted translationally so as to extend outwardly and to pour its contents onto one of the longitudinal conveyors 229, 229' or 232.

The gantries feeding the heap or picking up material from the latter are provided with lateral uprights on one side, which uprights 242 and 243 rest through the agency of running gears 244 on a raceway 245 while on the other side the gantries rest on a concrete layer 246 provided over the upper edge of the wall 230 with the interposition of running gears. It should be remarked that the picking up gantry is suitably sized and its inner upper outline is designed so as to be larger than the outer outline of the gantry dropping material on the heap so that the picking up gantry may move along the wall and ride as it passes over the gantry dropping material on the heap, each of said gantries being thus capable of serving the entire stocking area.

In the example illustrated, the wall is made of reinforced earth and it includes, according to conventional technique, an outer skin associated with inner reinforcing elements ensuring rigidity and a proper behavior of the entire wall. The wall is capped by concrete layers 246, 246' forming lateral raceways for the gantries, said runways being unitary or else, as illustrated, they may constitute two separate elements rigidly interconnected by ties 247,247'. The longitudinal conveyors are laid over a raised section 248 forming a solid longitudinal mass and also made of reinforced earth.

In the case where the stocking area is provided with a single gantry, the latter operates both for setting material on the heap and for picking up said material.

The axial conveyor is equipped so as to allow a reversal of the direction of its progression and it is provided with a dumping carriage adapted to pour the material out. When it operates for pouring material onto the heap, the conveyor conveys the material poured out of the dumping carriage on the longitudinal conveyor towards the periphery up to the dumping carriage on the axial conveyor, which latter ensures through its pouring out means the dropping of the material onto the heap, after which the winch-supporting carriage is rendered inoperative.

When it operates as a picking up gantry, the dumping carriage on the axial conveyor is rendered inoperative and the axial conveyor is driven in a direction opposed to the precedingly disclosed direction of progression and the material dumped by the picking up bucket or buckets onto the conveyors is conveyed by the latter from a point in vertical registry with the stocking area, towards the longitudinal wall and are dumped onto the conveyor carried by said wall.

Figure 14:
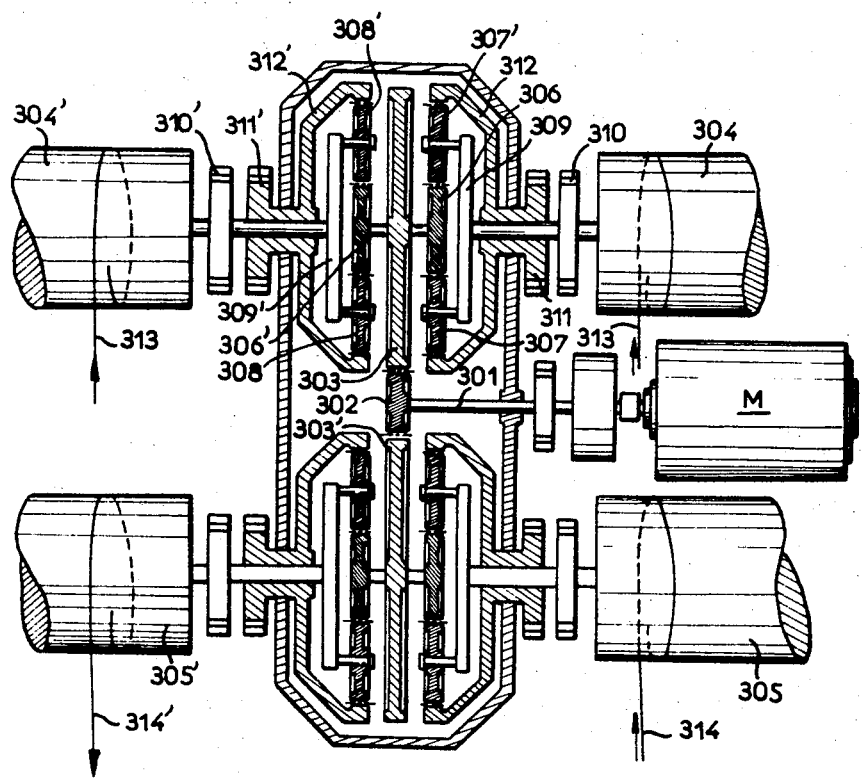
FIG. 14 is a plan view of a winch adapted to operate two buckets in a plant according to the invention.

Lastly, FIG. 14 is a plan view of a winch controlling twin buckets in a plant according to the invention. The motor 4 drives, through the shaft 301 and wheel 302, the large speed reducing gear 303 and 303', each of which is carried coaxially with the sunwheel of the corresponding epicycloidal gear leading to each of the drums 304 and 304' or 305, 305' as the case may be.

The speed reducing gear 303 is thus rigid with the sunwheels 306, 306' each of which engages the corresponding planet carrier 307, 307' or 308, 308' respectively. The planet carrier 309, 309' is rigid with the shaft of the corresponding drum 304 or 304' which shaft or the drum is provided with a locking brake 30 310 or 310' and identical locking breaks 311 and 311' are provided for the outer sunwheels 312, 312'.

The speed-reducing gear 303 is driven by the motor M and drives in its turn the sunwheels 309, 309'. The brakes 310 and 311 are controlled so as to show always opposite conditions one of said brakes being locked when the other is released. Thus, the brake 310 on the drum being operative, the brake 311 is inoperative and the sunwheel 312 revolves freely in which case the drum 304 is inoperative since its brake 310 prevents it from rotation. Conversely, when the brake 310 is in an inoperative position, the adjacent brake 311 is automatically on and locks the sunwheel, the movement of the other sunwheel 306 driving the planet carrier 309 and consequently the corresponding drum 304.

The structure of the four drums and associated epicycloidal gear is the same for each of them so that the driving shaft may, as desired and in accordance with the operative and inoperative positions of the drums, brakes and sunwheels drive respectively one, two, three or possibly four drums according to the requirements involved by the handling of the apparatus.

Optionally, the winch according to the invention may also include regulating means ensuring the automatic synchronization of the opening and closing movements with the rising and sinking movements of each of the buckets, said means of a known type being constituted for instance by a differential gear connected by means of a chain with each of the two drums serving a same bucket and shifting a nut adapted to slide between two contact pieces without being capable of revolving.

It should be remarked that the two coaxial drums, for instance the drums 304, 304' on the one hand and the drums 305, 305' on the other hand, are operated in the same direction whereas the tackles engaged by the cables 313, 313' on the one hand or 314, and 314' are wound in opposite directions. In the example illustrated, the drums 304 and 305 drawn on the right-hand side control respectively the rising and sinking operations of one bucket and its opening and closing movements while the drums 304' and 305' control similar operations for the other bucket; thus, the raising and sinking drums 304, 304' revolve in the same direction and carry along the buckets respectively upwardly and downwardly as a consequence of the opposite winding of the cables 313, 313'.

The preceding disclosure has been provided only by way of exemplification and many modifications may be brought thereto without widening the scope of the invention which is defined by the accompanying claims.

What we claim is:

1. A plant for handling loose solid material resting on a support comprising a horizontal gantry beam, at least one lateral support carrying said beam and adapted to overhang the material to be picked up, a carriage adapted to move alongside said beam, a winch carried by said carriage, twin buckets and means whereby the winch controls the movements of each of the two buckets synchronously and in opposite directions with reference to the other bucket at least one picking up bucket suspended to said winch to be moved along a vertical path between the support of the material and an upper dumping position, a belt conveyor extending in parallelism with the beam, a hopper fed by each bucket in its upper position and feeding the belt conveyor and mechanical means operating in synchronism with the movements of the bucket and adapted to dump the material carried by the bucket in its upper position out of the latter directly into the hopper without any horizontal translational movement of the bucket, said mechanical means collapsing at the end of the dumping of the material thereby to free the vertical path followed by the bucket.

2. A plant as claimed in claim 1 wherein the mechanical means are constituted by a dumping plane adapted to move between a vertical inoperative position to one side of the vertical path of the bucket and an operative position wherein said dumping plane forms a slope extending underneath the bucket in its upper position and the lower end of which registers with the upper end of the feed hopper.

3. A plant as claimed in claim 1 wherein the mechanical means control the rocking of the hopper round an axis extending along its lower edge to make its upper opening lie underneath the bucket in its upper dumping position, said rocking being controlled by the movements of the bucket to set the hopper in its sloping position whenever the bucket reaches its upper position, the hopper returning into its vertical position after the bucket has been dumped 4. A plant as claimed in claim 1 wherein the mechanical means include a dumping plane pivotally secured in its upper section round a stationary axis lying in parallelism with the axis of the gantry beam outside the vertical path followed by the bucket, a jack adapted to shift the dumping plane angularly out of its vertical inoperative position into an operative position for which it forms a slope extending underneath the bucket in its upper position, and means controlling the jack so that when the bucket reaches its upper dumping position, the dumping plane enters its operative position.

5. A plant as claimed in claim 1 wherein the beam includes a metal reinforcement, said plant including furthermore winches adapted to shift vertically the beam along its lateral supports.

6. A plant as claimed in claim 1 intended for erection between a wharf and a float for cooperation with a stocking area, wherein one beam support rests on an unloading wharf and the beam extends beyond said support to feed directly the stocking area, the other support of the beam resting on the float.

7. A plant as claimed in claim 1 comprising running gears for the beam to allow its movements alongside a stocking area.

8. A plant as claimed in claim 1 wherein the beam includes a sloping section adapted to adjustably rock round a pivotal axis on a lateral gantry support.

9. A plant as claimed in claim 1 wherein the heights of the beam supports are different, the shorter support resting on a wall running along a stocking area.

10. A plant as claimed in claim 1 wherein the heights of the beam supports are different, the shorter support resting on a wall running along a stocking area, and including two feet for the higher support forming two V-shaped parts lying in oblique planes parallel with the axis of the gantry beam, the apex of each V being pivotally carried by a running gear and the ends of the corresponding upper arms of the V's being connected together and pivotally secured to the lower surface of the beam.

11. A plant as claimed in claim 1 including running gears for the beam, the beam supports being provided with slopes extending symmetrically in transverse registry with each other to carry said running gears, thereby to provide the beam with a path oblique with reference to horizontality.

12. A plant as claimed in claim 1 including running gears for the beam, the beam supports being provided with slopes extending symmetrically in transverse registry with each other to carry said running gears thereby to provide the beam with a path oblique with reference to horizontality, means conveying the material to be handled from the level assumed by the conveyor on the beam onto which the material is dumped down to a lower position.

13. A plant as claimed in claim 1 adapted for use between a wharf and a float in a harbor for loading and/or unloading ships carrying loose material wherein one beam support includes a running gear allowing it to move along the wharf and the other support rests on the float.

14. A plant as claimed in claim 1 adapted for use between a wharf and a float in a harbor for loading and/or unloading ships carrying loose material wherein one beam support includes a running gear allowing it to move along the wharf and the other support rests on the float and ballasting means adapted to compensate automatically the modifications in the load of the plant and in the level of the water carrying the float.

15. A plant as claimed in claim 1 adapted for use between a wharf and a float in a harbor for loading and/or unloading ships carrying loose material wherein one beam support includes a running gear allowing it to move along the wharf and the other support rests on the float and superposed auxiliary beams pivotally secured at one end to the first-mentioned upright and at their other end to the second upright.

16. A plant as claimed in claim 1 resting on two floats wherein the supports are carried each by a float and are rigidly interconnected across their upper ends.

17. In combination with two plants as claimed in claim 1 for cooperation with a stocking area confined by a wall and with transportation means respectively, the provision of a conveyor carried by said wall and adapted to interconnect the two plants.

18. In combination with two plants as claimed in claim 1 for cooperation with a stocking area confined by awall and with transportation means respectively the provision of a conveyor carried by said wall and adapted to interconnect the two plants, said confining wall being made of reinforced earth.

19. In combination with two plants as claimed in claim 1 for cooperation with a stocking area confined by a wall and with transportation means respectively, the provision of a plurality of longitudinal parallel conveyors carried by said wall and adapted to interconnect the two plants, said confining wall being made of reinforced earth.

20. In combination with two plants as claimed in claim 1 for cooperation with a stocking area confined by a wall and with transportation means respectively, the provision of a conveyor carried by said wall and adapted to interconnect the two plants and means incorporated with the first plant for loading a ship with the material picked up from the stocking area and conveyed by said longitudinal conveyor.

21. In combination with two plants claimed in claim 1 for cooperation with two stocking areas, the provision of a wall separating the two stocking areas and comprising a raceway along each edge carrying each one of the supports of the corresponding beam and a plurality of belt conveyors cooperating with the conveyors on each beam to serve transportation means.

22. A plant as claimed in claim 1 comprising means for reversing the direction of progression of the conveyor.

23. A plant for handling loose solid material comprising a horizontal gantry beam, at least one lateral support carrying said beam and adapted to overhang the material to be picked up, a carriage adapted to move alongside said beam, a winch carried by said carriage, twin bucks, means whereby the winch controls the movements of each of the two buckets synchronously and in opposite directions with reference to the other bucket, a belt conveyor extending in parallelism with the beam, a hopper fed by each bucket in its upper position and feeding the belt conveyor, and mechanical means operating in synchronism with the movements of each bucket and adapted to dump the material carried by the bucket in its upper position out of the latter directly into the hopper without any horizontal translational movement of the bucket, said mechanical means collapsing at the end of the dumping of the material thereby to free the vertical path followed by the bucket.

24. A plant as claimed in claim 23 comprising two pivoting hoppers, each of them is associated with one bucket, mechanical means controlling the rocking of said hoppers around an axis extending along the lower edge thereof to make its upper opening lie underneath the corresponding bucket in its upper dumping position, said rocking being controlled by the movements of the bucket to set the corresponding hopper in its sloping position whenever the bucket reaches its upper position, the hopper returning into its vertical position after the bucket has been dumped.

25. A plant as claimed in claim 23 wherein the mechanical means include a dumping plane pivotally secured in its upper section round a stationary axis lying in parallelism with the axis of the gantry beam outside the vertical path followed by the bucket, a jack adapted to shift the dumping plane angularly out of its vertical inoperative position into an operative position for which it forms a slope extending underneath the bucket in its upper position, and means controlling the jack so that when the bucket reaches its upper dumping position, the dumping plane enters its operative position.

26. A plant as claimed in claim 23, wherein the mechanical means include a dumping plane for each bucket, each dumping plane being made of one lower pivoting panel articulated by its lower edge to the upper edge of the hopper and of one upper pivoting panel articulated by its upper edge to the carriage, a jack associated with each panel and adapted to move it synchronously with the movement of the corresponding bucket, both upper and lower panels forming, when put in register with each other, a single dumping plane directing the material falling from the bucket towards the hopper and being adapted to disappear angularly to free the vertical path of the bucket.

27. A plant for handling loose solid material comprising a horizontal gantry beam, at least on lateral support carrying said beam, the beam being adapted to move axially, a winch carried by said beam, twin buckets, means whereby the winch controls the movements of each of the two buckets synchronously and in opposite directions with reference to the other bucket, a belt conveyor extending in parallelism with the beam, a hopper fed by each bucket in its upper position and feeding the belt conveyor, a portal astride the hopper and from which the buckets are suspended, two pivoting lower dumping panels articulated by their base on the hopper and two pivoting upper dumping panels articulated by their upper edge on said portal, each lower pivoting dumping panel being associated with one of the upper pivoting dumping panels situated on the same side of the hopper, the installation further comprising mechanical means operating in synchronism with the movements of the buckets and adapted to put both upper and lower panels in register with each other in a substantially common plane so as to form a single disappearing plane disposed underneath the bucket in high position and directing the material falling from the bucket towards the hopper, the lower and upper panels being adapted angularly to disappear so as to free the vertical path of the corresponding bucket.

28. A plant for handling loose solid material comprising a horizontal gantry beam, adapted to overhang the material to be picked up, a carriage adapted to move alongside said beam, a winch carried by said carriage, twin buckets, means whereby the winch controls the movements of each of the two buckets synchronously and in opposite directions with reference to the other bucket, a belt conveyor extending in parallelism with the beam, a hopper fed by each bucket in its upper position and feeding the belt conveyor, wherein the beam rests on two lateral supports, the heights of which are different, the shorter support resting on a wall running along a stocking area the higher support comprising two feet forming two V shaped parts lying in oblique planes parallel with the axis of the gantry beam, the apex of each V being pivotally carried by a running gear and the ends of the corresponding upper arms of the V's being connected together and pivotally secured to the lower surface of the beam.

29. A plant as claimed in claim 28 including means conveying the material to be handled from the level, assumed by the conveyor on the beam onto which the material is dumped, down to a lower position.

30. A plant for handling loose solid material comprising a horizontal gantry beam, two lateral supports carrying said beam and adapted to overhang the material to e picked up, a carriage adapted to move alongside said beam, a winch carried by said carriage twin buckets, means whereby the winch controls the movements of each of the two buckets synchronously and in opposite directions with reference to the other bucket, a belt conveyor extending in parallelism with the beam, a hopper fed by each bucket in its upper position and feeding the belt conveyor, wherein said beam comprises running gears, the beam supports being provided with slopes extending symmetrically in transverse registry with each other to carry said running gears, thereby to provide the beam with a path oblique with reference to horizontality.

31. A plant for handling loose solid material comprising a horizontal gantry beam, two lateral supports carrying said beam and adapted to overhang the material to be picked up, a carriage adapted to move alongside said beam, a winch carried by said carriage, twin buckets means whereby the winch controls the movements of each of the two buckets synchronously and in opposite directions with reference to the other bucket, a belt conveyor extending in parallelism with the beam, a hopper fed by each bucket in its upper position and feeding the belt conveyor the plant being adapted for use between the wharf and a float in a harbor for loading and/or unloading ships carrying loose material and wherein one beam support includes a running gear allowing it to move along the wharf and the other support rests on the float, both supports being secured together by two superposed auxiliary beams pivotally secured at one end to the first-mentioned support and at their other end to the second support, both superposed auxiliary beams forming an articulated parallelogram thus allowing the floating support to be firmly secured to the other support yet following the movement of the tide.

32. A plant for handling loose solid material comprising a horizontal gantry beam, two lateral supports carrying said beam and adapted to overhang the material to be picked up, a carriage adapted to move alongside said beam, a winch carried by said carriage, twin buckets, means whereby the winch controls the movements of each of the two buckets synchronously and in opposite directions with reference to the other bucket, a belt conveyor extending in parallelism with the beam, a hopper fed by each bucket in its upper position and feeding the belt conveyor, wherein the supports are carried each by a float and are rigidly interconnected across their upper ends and are provided with carrier slopes adapted to make the beam assure a rising and sinking movement, the plant including furthermore an auxiliary outwardly projecting conveyor adapted to make the material dumped by the conveyor on the beam progress towards the lower end of the slope thereby serve transportation means.

33. A double stocking area comprising two twin plants for handling loose solid material each plant comprising a horizontal gantry beam, two lateral supports carrying said beam and adapted to overhand the material to be picked up, a carriage adapted to move alongside said beam, a winch carried by said carriage, twin buckets, means whereby the winch controls the movements of each of the two buckets synchronously and in opposite directions with reference to the other bucket, a belt conveyor extending in parallelism with the beam, a hopper fed by each bucket in its upper position and feeding the belt conveyor, wherein the stocking area is divided in two parts, each of them being served by one plant, by a central wall made of reinforced earth.

34. A plant for handling loose solid material resting on a support comprising a horizontal gantry beam, at least one lateral support carrying said beam and adapted to overhang the material to be picked up, a carriage adapted to move alongside said beam, a winch carried by said carriage, said winch controlling twin buckets moving synchronously in opposite directions and the weights of which when empty balance each other, said winch including at least two drums controlling each one of the twin buckets, a common driving shaft, a sun and planet gear driven by said shaft and controlling in alternation the movement and the locking of the two drums, at least one picking up bucket suspended to said winch to be moved along a vertical path between the support of the material and an upper dumping position, a belt conveyor extending in parallelism with the beam, a hopper fed by each bucket in its upper position and feeding the belt conveyor and mechanical means operating in synchronism with the movements of the bucket and adapted to dump the material carried by the bucket in its upper position out of the latter directly into the hopper without any horizontal translational movement of the bucket, said mechanical means collapsing at the end of the dumping of the material thereby to free the vertical path followed by the bucket.

35. A plant as claimed in claim 34 wherein said winch comprises four drums controlling respectively the rising and sinking movement of one bucket, the rising and sinking movements of another bucket, the opening and closing movements of the one bucket and the opening and closing movements of the other bucket, a driving shaft and sun and planet gears through which the driving shaft constrains the drums to be driven and locked selectively.

36. A plant as claimed in claim 34 wherein said winch comprises four drums controlling respectively the rising and sinking movements of one bucket, the rising and sinking movements of another bucket, the opening and closing movements of the one bucket and the opening and closing movements of the other bucket, a driving shaft and sun and planet gears including each a planet carrier rigid with the corresponding drum and a first sunwheel controlled by the driving shaft and locking means associated with each other sunwheel and with each drum and controlled so the locking of each other sunwheel is associated with the release of the corresponding drum and conversely.

37. A plant as claimed in claim 34 wherein said winch comprises four drums controlling respectively the rising and sinking movements of one bucket, the rising and sinking movements of another bucket, the opening and closing movements of the one bucket, and the opening and closing movements of the other bucket, a driving shaft, two speed reducing toothed wheels driven by the driving shaft in diametrically opposed positions with reference thereto and sun and planet gears including each a planet carrier rigid with the corresponding drum and a first sunwheel controlled by the toothed wheel corresponding to the pair of drums to be considered and locking means associated with each other sunwheel and with each drum and controlled so that the locking of each other sunwheel is associated with the release of the corresponding drum and conversely.

38. A plant as claimed in claim 34 wherein said winch comprises four pairwise aligned drums controlling respectively the rising and sinking movements of one bucket, the rising and sinking movements of another bucket, the opening and closing movements of one bucket and the opening and closing movements of the other bucket, a driving shaft and sun and planet gears through which the driving shaft constrains the drums to be driven and locked selectively.

39. A plant as claimed in claim 34 wherein said winch comprises four drums controlling respectively the rising and sinking movements of one bucket, the rising and sinking movements of another bucket, the opening and closing movements of the one bucket and the opening and closing movements of the other bucket, a driving shaft, two speed reducing toothed wheels driven by the driving shaft in diametrically opposed positions with reference thereto and sun and planet gears including each a planet carrier rigid with the corresponding drum and a first sunwheel controlled by the toothed wheel corresponding to the pair of drums to be considered and remotely controlled brakes associated with each other sunwheel and with each drum and controlled so that the locking of each other sunwheel is associated with the release of the corresponding drum and conversely.

40. A plant for handling loose solid material comprising a horizontal gantry beam, at least one lateral support carrying said beam and adapted to overhang the material to be picked up, a carriage adapted to move alongside said beam, a winch carried by said carriage, twin buckets, means whereby the winch controls the movements of each of the two buckets synchronously and in opposite directions with reference to the other bucket, a belt conveyor extending in parallelism with the beam, a movable hopper fed by each bucket in its upper position and feeding the belt conveyor, mechanical means controlling the shifting of the hopper along a line parallel with the axis of the beam between an operative position lying underneath the bucket in its upper dumping position and an inoperative position lying out of vertical registry with the vertical path followed by the bucket, said shifting being controlled in unison with the movements of the bucket to set the hopper in its operative position whenever the bucket reaches its upper position and to return the hopper into its inoperative position away from said vertical path after the bucket has been dumped.

* * * * *